April 26, 1938. N. A. CHRISTENSEN 2,115,383
HYDRAULIC BRAKE
Filed Dec. 29, 1933
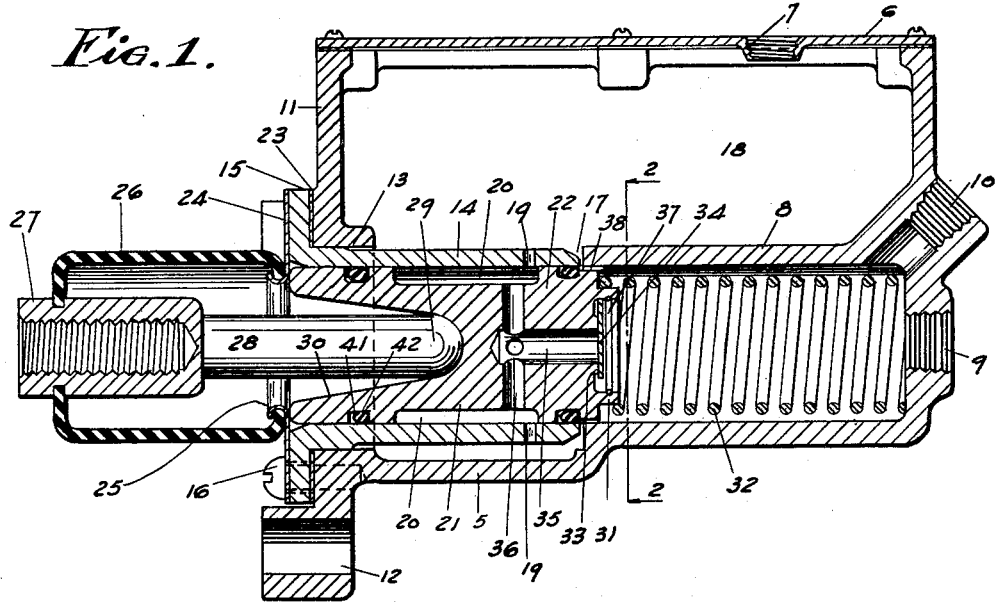
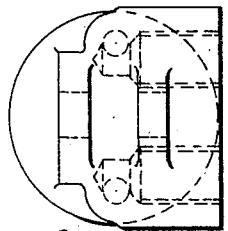
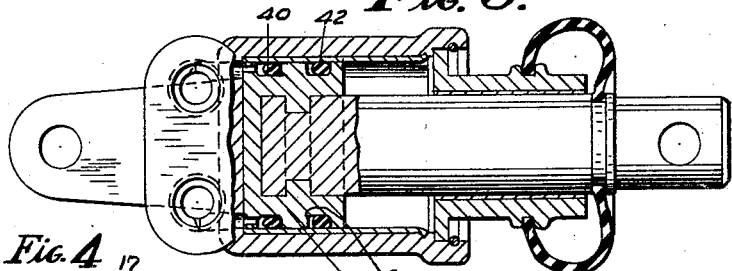
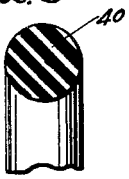
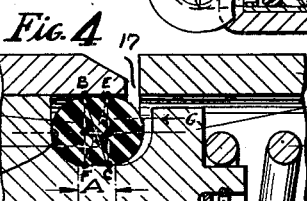
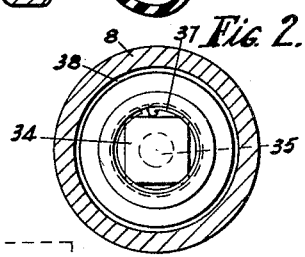
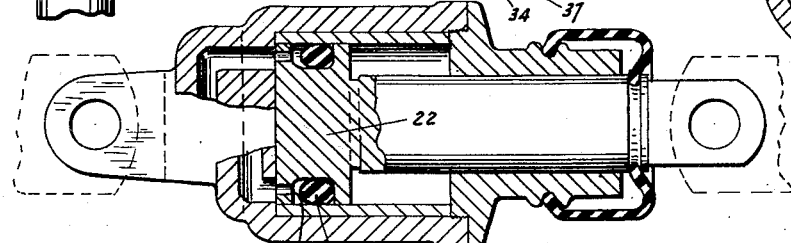
INVENTOR
NIELS A. CHRISTENSEN
BY
ATTORNEY Patented Apr. 26, 1938

2,115,383

UNITED STATES PATENT OFFICE 2,115,383

HYDRAULIC BRAKE

Niels A. Christensen, South Euclid, Ohio

Application December 29, 1933, Serial No. 704,463

7 Claims. (Cl. 60—54.6)

This invention relates to new and useful improvements in hydraulic brakes and more particularly to an improved seal for the pistons of power conveying cylinders.

An important object of the invention is to provide these seals in the form of highly compressed elastic packing rings slidable with the piston and on cylinder walls lubricated by the hydraulic brake fluid of the system to avoid such wear as would be expected in subjecting the rings to a sliding action.

Another object of the invention is to provide a power conveying cylinder which will automatically compensate for any loss of liquid in the system upon return strokes of the piston.

A further object of the invention is to provide a simple, inexpensive and easily assembled construction which will outlive the usual cups employed heretofore.

Other objects and advantages of the invention will become apparent during the course of the following description.

In the accompanying drawing forming a part of the description and wherein like numerals are employed to designate like parts throughout the several views, Fig. 1 is a longitudinal section of the improved power conveying cylinder, Fig. 2 is a fragmentary transverse section of the same taken on the line 2—2 of Fig. 1, Fig. 3 is an enlarged section of the improved packing ring prior to assembly, Fig. 4 is an enlarged fragmentary longitudinal section of a portion of a power conveying cylinder illustrating the packing ring in operative compressed condition.

Figs. 5 to 7 inclusive are views of modified forms of power conveying cylinders.

Referring now more particularly to the drawing for a more detailed explanation of the principle of the invention, the numeral 5 designates the main casing of a power conveying cylinder formed with an open top which is closed by a removable cover 6 having a suitable threaded and flanged opening 7 for the insertion of a filling and vent plug, not shown. The casing is formed with an integral barrel or cylinder portion 8, the forward end of which is provided with threaded nipple apertures or ports 9 and 10 for the attachment of pipes or conduits, one leading to other power conveying cylinders of the front wheel brakes of the vehicle and the other to the rear wheel brake mechanisms to create pressure therein by which the front and rear brakes are applied.

The rear wall 11 of the power conveying cylinder is provided with an integral apertured extension 12 for the rigid attachment of the casing to a fixed part of the vehicle. This rear wall is also provided with an opening 13 coaxial with the bore of barrel 8 for the reception of a separate cylinder 14 having its outer end provided with a lateral annular flange 15 to attach the cylinder to the casing 5 by means of screws 16 and to space the forward end of cylinder 14 from the rear end of barrel 8 thereby providing a restricted annular port 17 forming means of communication between the interior of the barrel 8 and the space between the same and the cover 6 which forms an oil reservoir 18. This cylinder forms a continuation of barrel 8. A plurality of circumferentially spaced openings 19 are provided in the cylinder 14 rearwardly of ports 17 to always communicate the reservoir with the annular space 20 formed between cylinder 14 and the reduced mid-section 21 of a reciprocatory piston 22 slidably received within the cylinder 14 and barrel 8.

A gasket 23 is positioned between the rear end 11 of the casing and the lateral flange 15 of cylinder 14 to provide a liquid seal and also may be used in varying thicknesses to vary the width of the annular port 17. Secured to the outer face of lateral flange 15 by means of screws 16, is a metal stop disc 24 having a central opening surrounded with a turned back flange 25, forming a groove into which fits one end of an elastic boot 26. The outer end of this boot is fitted within an annular groove of the socket end 27 of a piston stem 28 to exclude extraneous matter from the piston and cylinder. This socket receives a threaded shank which may be connected to the usual brake pedal of a motor vehicle or any other form of actuating mechanism. The inner end 29 of the piston stem is semispherical to fit within a corresponding cavity 30 in the piston 22. This cavity 30 is of somewhat conical form so that the stem has, in effect, a universal connection with the piston whereby axial thrust can be exerted on the piston regardless of angularity of its stem.

The forward end or working face of piston 22 is provided with a forwardly extending reduced concentric flange 31 which is encircled by one end of a compression coil spring 32, the other end of which abuts the forward wall of barrel 8 to normally return or assist in returning the piston 22 to normal position shown in Fig. 1 in which position the brakes are in released condition. The forward working face of the piston within the annular flange 31 is provided with an annular raised valve seat 33 upon which seats a flat floating valve plate 34. This valve plate is non-circular and preferably square with a diagonal equal to the inner diameter of flange 31 whereby the corners of the valve plate slidably engage the inner surface of this flange and maintain the same centralized with respect to an axial port 35 extending through the valve seat and communicating at its rear end with the annular space 20 around the piston by means of a plurality of lateral radial ports 36. The outward movement of the valve 33 from its seat is limited by means of a circular spring clip 37 seated in an annular groove in the inner surface of flange 31. The clip has a diameter less than that of the flange to engage with the corners of the valve plate and thereby retain it within the flange 31.

The forward end of piston 22 is slightly reduced and smaller than the bore in the barrel 8 to form an annular passage 38 communicating with the annular port 17 when the piston is in retracted brake release position whereby liquid from the reservoir 18 can pass into the barrel ahead of the piston to replenish any oil which may have escaped from the system by leakage.

Immediately behind this reduced forward end of the piston, the latter is provided with an annular groove 39 in which is received an elastic packing ring 40 best seen in Figs. 3 and 4. An identical groove 41 and packing ring 42 is provided in the piston 22 further rearwardly from the forward working face of the piston than the first mentioned ring to serve as a seal or safety factor should the first mentioned ring fail or leak due to inferior or defective material. In Fig. 1 this second ring 42 is positioned in a groove located rearwardly of the reduced intermediate portion of the piston, but if desired it may be arranged closer to the first ring and forwardly of the reduced portion of the piston as shown in Fig. 5.

These packing rings are made of solid rubber or rubber composition very dense and yet possessive of great liveliness and compressibility. A glyptal composition has been found extremely serviceable and resistant to wear and leakage throughout prolonged and severe tests. Each ring is perfectly circular and prior to assembly possesses circular cross section as shown in Fig. 3. Its inner periphery is slightly less than the circumference of the piston under the groove while its exterior circumference is greater than the inner circumference of the cylinder so that when it is slid with the piston within the cylinder 14 and barrel 8, the ring is compressed into substantially ellipsoidal section as shown in Fig. 4. I have found in one embodiment of the invention that a circular section ring having a section diameter of $\frac{7}{8}$ of an inch serves admirably for the purposes when it is compressed about $\frac{1}{8}$ of an inch when installed thereby causing the normal circular section of the ring to flatten out to the extent of about $\frac{3}{32}$ of an inch on its opposite sides as indicated by the dimension line "A" of Fig. 4. In other words, the minor diameter of the section when installed is approximately $\frac{5}{32}$ of an inch while its major diameter is approximately $\frac{3}{32}$ of an inch. When in this compressed condition within its respective groove, the latter is approximately $\frac{1}{16}$ of an inch wider than the major diameter of the ellipsoidal form of the ring to thereby compel sliding as distinguished from rolling movement of the ring during reciprocations of the piston. A slight clearance between the ring and one side of its groove permits slight shifting of the ring relative to the piston, but not sufficient to permit twisting of the ring about its axis as would be caused by rolling action of the ring through 360 degrees. However this sliding or partial rolling of the ring, as by the shifting of point B to E and C to F when the piston moves in the direction of arrow G, Fig. 4, kneads or works the material of the ring to keep it alive and pliable without deleterious effects of scuffing which are caused by purely static sliding of rubber upon a surface. By this slight turning or kneading action, the life of the ring is prolonged. When the piston moves in the direction of the arrow G, the ring 40 will be moved over against the right hand wall of the groove, but when the piston moves in the direction of the arrow D, point E shifts to B and F to C which is a partial turn of the ring so that it is positioned back against the left hand wall of the groove and thereafter is caused to slide along the wall of the barrel or cylinder. This causes the ring to slightly roll across the port 17 and then slide after passing the same.

Referring to Fig. 1, the piston is illustrated in its normal position to release the brakes. In this position, hydraulic brake fluid from the reservoir 18 enters the barrel 8 through port 17, via space 38 to replenish liquid in the system or lines. To apply the brakes by placing liquid in the system under pressure, the piston stem 28 is moved to the right of Fig. 1 under the action of the usual brake pedal or other means, thereby causing the piston 22 to move in a corresponding direction. This causes the rings 40 and 42 to slide along the bores of the cylinder 14 and barrel 8 respectively. The slightest forward movement of the piston causes ring 40 to move over and close port 17 thereby cutting off flow of liquid from the reservoir to the barrel. As soon as the piston begins its forward movement, the valve 34 is caused to close by the constantly increasing pressure of liquid in the barrel 8. The liquid in the barrel is forced out through the ports 9 and 10 to their respective pipe lines to actuate brake applying mechanisms within the brake drums. As the piston moves forwardly, pressure in the barrel 8 reacts through the space 38 and against the ring 40 to further compress it against the piston and barrel walls to thereby further reduce the possibility of leakage past the ring. This ring being in contact with the brake liquid, and lubricated cylinder walls, is always extremely slippery to be freely slidable and minimize friction in spite of its highly compressed condition. It possesses one very distinct advantage over the usual skirted cup and that is, it has no skirt which will collapse and cause leakage upon retractile movement of the piston.

Upon the return stroke of the piston 22 upon release of foot pedal pressure against the piston, the retractile spring 32 will expand to assist in moving the piston rearwardly so that the valve plate 34 will be lifted from its seat by the rush of liquid coming from the reservoir 18 to the port 19 and through the passages 20, 36 and 35 until the piston reaches the limit of its return stroke determined by the abutment of the outer end of the piston with that portion of the plate 24 which is bent for the reception of the inner end of the boot 26. This predetermined idle position of the piston automatically returns the ring 40 back beyond the port 17 so that whenever necessary, liquid may pass from the reservoir 18 into the barrel 8 in advance of the piston to compensate for any leakage which may occur.

It will of course, be understood that instead of providing the packing groove in the piston, it may be placed in the cylinder wall and the packing ring placed therein, and the claims are to be construed as covering this alternative construction.

I claim:

1. In a hydraulic brake system, a casing divided by an integral wall into a reservoir and barrel, a cylinder extending through a wall of the casing and in alignment with said barrel to form a continuation thereof, said barrel and cylinder being spaced apart to form a port therebetween, a piston operating in said cylinder and barrel, and a packing ring carried by the piston and arranged behind said port when the piston is in retracted position.

2. In a hydraulic brake system, a casing divided by an integral wall into a reservoir and barrel, a cylinder extending through a wall of the casing and in alignment with said barrel to form a continuation thereof, said cylinder being spaced from the barrel to form a port therebetween, said cylinder having a lateral flange for limiting inward movement of the cylinder and predetermining the size of the port between said cylinder and barrel, a piston operating in said cylinder and barrel, and a packing ring carried by the piston and arranged behind said port when the piston is in retracted position.

3. A device of the class described comprising a casing divided by an integral wall into a reservoir and a barrel, a cylinder in alignment with said barrel to form a continuation thereof, said barrel and cylinder being spaced apart to form a port therebetween, and a piston operable in said cylinder and barrel.

4. A device of the class described comprising a casing divided by an integral wall into a reservoir and a barrel, a cylinder in alignment with said barrel to form a continuation thereof, said barrel and cylinder being spaced apart to form a port therebetween, means for varying the spacing between said barrel and cylinder to vary the size of said ports, and a piston operable in said cylinder and barrel.

5. A device of the class described comprising a casing divided by an integral wall into a reservoir and barrel, a cylinder in alignment with said barrel to form a continuation thereof, said barrel and cylinder being spaced apart to form a port therebetween, said cylinder having a lateral flange exteriorly of the casing, means disposed between said flange and casing for predetermining the size of said port, and a piston operable in said barrel and cylinder.

6. A device of the class described comprising a cylinder, a piston therein, means for urging the piston to return to idle position after being moved, a disc secured to the end of the cylinder to form an abutment for the piston when in idle position and said disc being formed with a groove and a boot having an end received in said groove.

7. A device of the class described comprising a cylinder adapted to contain a liquid, a piston in said cylinder adapted to force the liquid therein forwardly of the cylinder, a reservoir, said cylinder having a port communicating the reservoir and cylinder forwardly of the normal retracted position of the piston, said piston having an annular groove adjacent its forward pressure face, a rubber packing ring received in said groove, said groove being slightly wider than the packing ring to induce rolling action of the ring during a predetermined travel of the piston, said ring being compressed between the piston and cylinder wall, and said packing ring being disposed slightly rearwardly of said port and in the forward end of said groove when the piston is in its normal retracted position, and adapted to roll across said port as the piston moves forward and to slide upon the cylinder walls after passing said port.

NIELS A. CHRISTENSEN.